Figure 1:
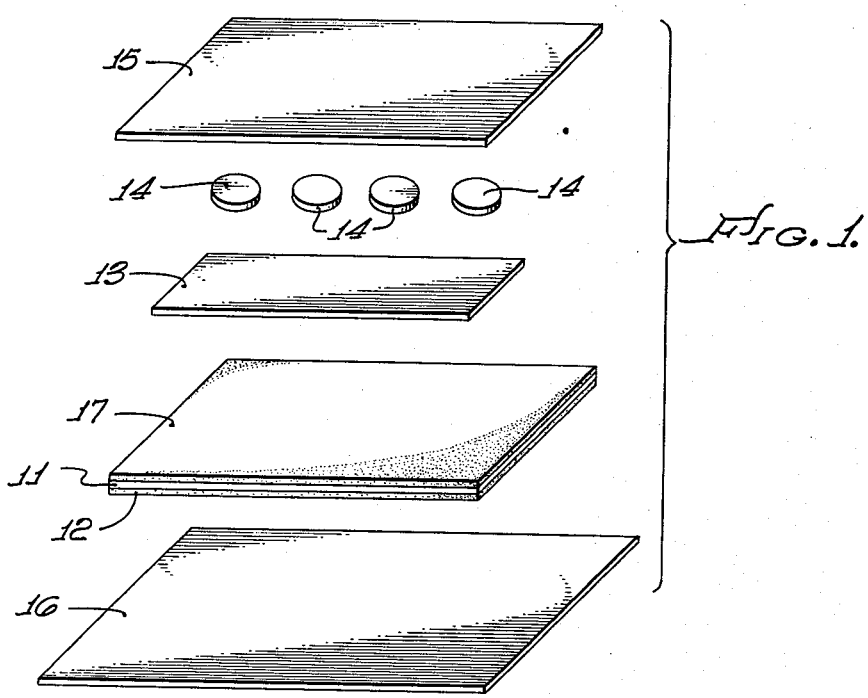

Oct. 3, 1961     W. WAHL ET AL     3,002,385
TEMPERATURE INDICATOR

Filed Feb. 12, 1960     2 Sheets-Sheet 1

INVENTORS.
WILLIAM WAHL
LLOYD B. CAMPBELL
BY
Richard F. Carr
ATTORNEY.

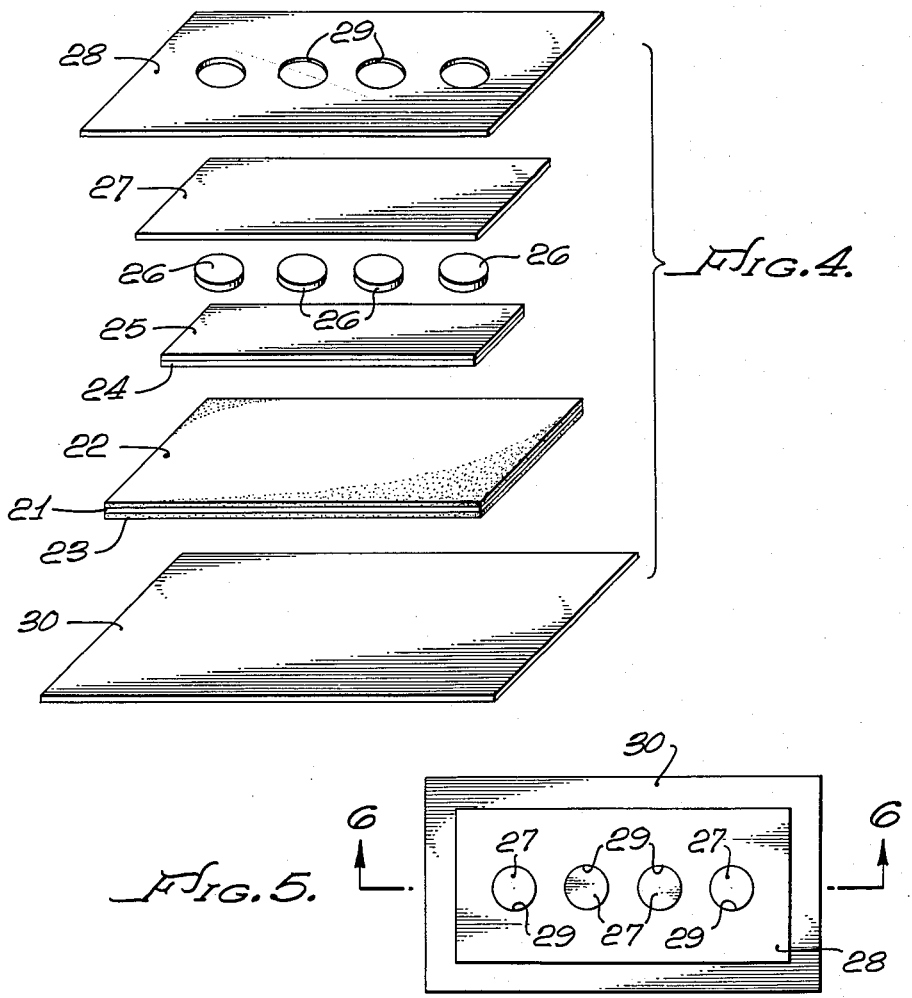
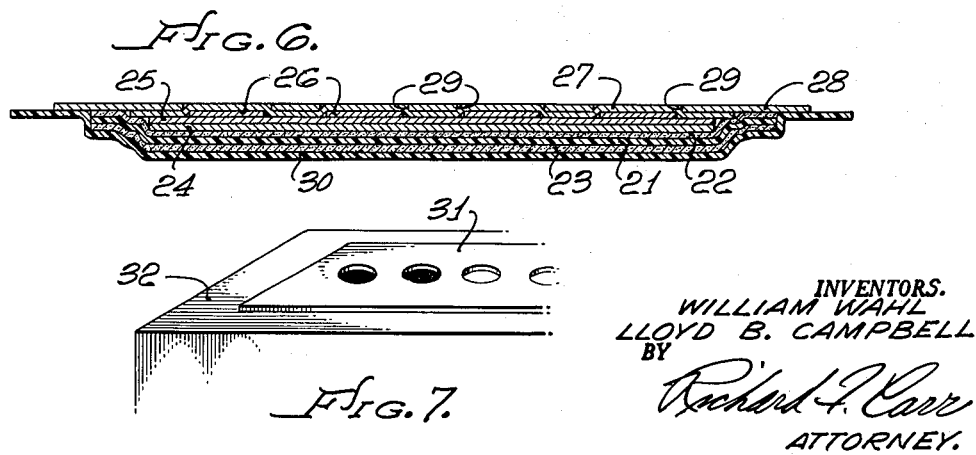

United States Patent Office 3,002,385
Patented Oct. 3, 1961

3,002,385
TEMPERATURE INDICATOR
William Wahl, Pacific Palisades, and Lloyd B. Campbell, Los Angeles, Calif., assignors to Pyrodyne, Incorporated, Los Angeles, Calif., a corporation of California
Filed Feb. 12, 1960, Ser. No. 8,409
14 Claims. (Cl. 73—356)

This invention relates to a temperature indicator. More particularly, this invention relates to a temperature indicator which can be attached to the surface of a workpiece which is to undergo heat treatment.

Temperature indicating materials of various types are known in the art. Some are available commercially in the form of a paste. A characteristic of the paste is that it changes color at a particular fixed temperature. A dab of the paste is applied to the surface of a workpiece which is to be heated. When the workpiece and color indicator reach a predetermined temperature, the dab of paste changes color providing visual observation that a particular temperature in the heating process has been reached. Quite often however, the material employed to indicate a particular temperature by means of a color change, reverts to its original temperature upon cooling. Consequently after cooling there is no record of the previous heat-treating history of the workpiece on the surface of which the temperature indicator was employed. Hence, there is a need for a temperature indicator which will aid in providing a record of the heat treatment to which a workpiece has been subjected.

It is therefore an object of this invention to provide a temperature indictor which exhibits a non-reversible color change at a predetermined temperature. It is also an object of this invention to provide a temperature indicator capable of recording a plurality of different temperatures through which a workpiece has passed in a heat treating process. Another object is to provide a temperature indicator which can be readily affixed to the surface of a system which is expected to acquire a temperature history. Still another object is to provide a temperature indicator containing a plurality of temperature sensitive elements. It is likewise an object to provide a temperature indicator which is not affected by fuels, oils, solvents, dust or electrical disturbances. Still other objects will become apparent from the discussion which follows.

The above and other objects of this invention are accomplished by providing a temperature indicator comprising a colored material and a fusible temperature indicating material disposed on said colored material, said colored material having a color different from the color of said temperature indicating material. For a number of different temperatures a variety of substances are used as the fusible temperature indicating material as more fully described below. Organic and mixtures of inorganic salts are employed. The colored material on which the temperature indicator is disposed can be absorbent colored paper or carbon black-covered metal foil. When the temperature indicating material melts at the temperature it is designed to indicate, it is absorbed by the colored blotting paper, or becomes mixed with the carbon black on which the indicator rests. In either case the color of the blotting paper or of the carbon black predominates even after cooling and solidification of the color indicating material. In this manner a non-reversible color change takes place which provides a permanent visible record indicating that a particular temperature has been experienced by that portion of a workpiece to which the indicator is attached.

The fusible color indicating material and the colored material on which the former is disposed is usually enclosed in a suitable envelope. At least part of the envelope is made of a transparent substance. The transparent portion of the envelope is placed over the fusible temperature indicating material in order that the color changes may be visually observed. The envelope can be made of plastic for service at relatively low temperatures of say up to 700° F. For higher temperatures the "window" over the fusible temperature indicating material is made of material having a high inorganic content, such as for example, mica. In order to hold the mica in position, a perforated metal foil is placed with the perforations above the temperature indicating material. Changes in the indicating material are observed through the perforations.

The various layers of materials making up the temperature indicator are laminated together with the aid of a suitable adhesive as more fully described hereinbelow. The assembled temperature indicator is attached, also by means of an adhesive, to a surface on which the temperature is to be monitored.

Figure 2:
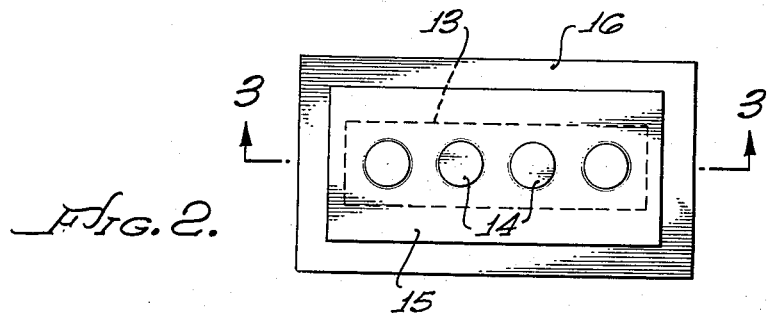
Figure 3:
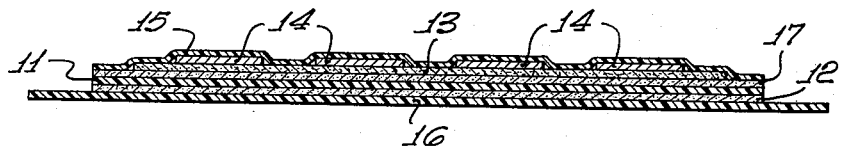

The temperature indicators of this invention may be more fully described with the aid of the accompanying drawings in which FIG. 1 is an exploded view of a temperature indicator of this invention showing the component parts. FIG. 2 shows a top view of the assembled temperature indicator. FIG. 3 is a cross-sectional view taken along line 3—3 of FIG. 2. FIG. 4 is an exploded view of another embodiment of the temperature indicator of this invention. FIG. 5 is a top view of the temperature indicator of FIG. 4 in assembled form. FIG. 6 is a cross sectional view taken along line 6—6 of FIGURE 5. FIG. 7 shows a temperature indicator attached to the surface of a workpiece. The components of the temperature indicator are described more fully below.

As seen in FIGS. 1–3, the temperature indicator of this invention includes a base 11 which is made of any suitable material such as plastic, metal, or asbestos. The base has an adhesive 12 disposed on one surface, and another adhesive layer 17 on the opposite surface. A strip of colored material 13, which may be either colored paper or of metal, is secured by adhesive 17 to the upper surface of base 11. Colored absorbent paper such as blotting paper, is suitable for this colored material for units to be subjected to relatively low temperatures. When made of metal, for higher temperature uses, the strip has a colored substance on its surface. The temperature indicating material 14, disposed on the colored strip, is an organic or inorganic substance as more fully described below. A cover strip 15 of a transparent plastic or mica blankets the top of the unit and is held in place by adhesive 17. Preferably a strip of anti-adhesive material 16 is included to protect the adhesive 12 prior to the time this adhesive is used to attach the assembly to an object to be heated.

As seen in the top plan view of FIG. 2, the colored absorbent material 13 is visible through transparent cover 15. The temperature indicating material 14, which is disposed on the colored absorbent material, also may be seen through the plastic cover.

FIG. 4 presents an exploded view of another embodiment of a temperature indicator of this invention. A base 21, made of plastic film or asbestos in sheet form has its two major surfaces coated with films of adhesive 22 and 23. A strip of metal foil 24 is coated with a film of colored substance 25 such as carbon black. The temperature indicating material 26 is shown in the form of round tablets. It can, however, be present in powdered form and in any other appropriate size or shape. The transparent cover strip 27 is made of mica in this illustration. A metal foil cover 28 contains view holes 29 below which the portions of temperature indicating material 26 are disposed. A strip of anti-adhesive backing 30 is adapted to protect the adhesive film 23 on the under surface of base 21 until the temperature indicator is to be affixed to the surface whose temperature is to be monitored.

FIG. 5 is a top view of the temperature indicator assembled from the components of FIG. 4.

FIG. 6 is a view taken through section 6—6 of FIG. 5. This figure presents a cross-sectional view of the assembled temperature indicator from the components shown in FIG. 4. The numbers for corresponding components in FIGS. 4 and 6, are the same for ready identification.

FIG. 7 shows an assembled temperature indicator 31 affixed to the surface of an object 32 whose temperature is to be observed.

The plastic film employed for the base 11 and cover 15, illustrated in FIG. 1, is made of any suitable transparent synthetic film material. Polyethylene terephthalate films, bondable tetrafluorethylene resin films, polytetrafluorethylene films and other fluorocarbon films are examples of plastic films employed in the temperature indicators of this invention. Included among the various suitable polyethylene terephthalate films are those made of saturated linear polyesters, unsaturated linear polyesters, styrene cross-linked unsaturated linear polyesters and three-dimensional polyesters. These films are well-known in the art and are described in "Modern Plastics Encyclopedia," issue for 1959, volume 36, number 1A, pages 142 and 601, September 1958. Polyethylene films are also employed in the manufacture of temperature indicators. Other suitable films include those formed of polyvinyl chloride, vinyl chloride-vinyl acetate copolymer, nitrocellulose, cellulose acetate, cellulose propionatebutyrate and polyvinylidene chloride. Still other films will be apparent to those skilled in the art.

The thickness of the film employed varies from about 0.0005 inch to about 0.003 inch. Films having a thickness of substantially 0.002 inch, for example, are found to serve well in the manufacture of the temperature indicators.

The colored absorbent material 13 shown in FIG. 1 is composed of a spongy substance such as blotting paper or of a spongy synthetic fiber material. It is of a color which contrasts with the color of the temperature indicating material. Hence, when the temperature indicating substance melts and is absorbed by the absorbent material, the color of the latter will be visible to the eye of the observer, thus providing a record of the melting of the indicator. Black blotting paper has been employed as the colored absorbent material and its use constitutes an embodiment of this invention. Paper with a film of carbon-black or pigment on its surface also serves well as the absorbent material. A strip of metal foil 24, as shown in FIG. 4, with a coating of pigment or carbon black on its surface is also used. The metal foil is employed in temperature indicators to be used at high temperatures, that is, at temperatures of from about 500° F. to about 2000° F. An aluminum foil with a coating of carbon black is found to be satisfactory and constitutes an embodiment of this invention. The aluminum foil is suitable at temperatures of from about 500° F. to about 700° F. At temperatures of from about 700° F. to about 2000° F., a stainless steel foil with a coating of carbon black is found to be satisfactory, and its use constitutes another embodiment of this invention. Other metal foils also are employed, including foils of copper, tin, magnesium, lead, iron, silver, nickel, tungsten and alloys of the various metals. The thickness of the foils ranges from about 0.001 inch to about 0.003 inch in general. It is preferred to use thicknesses of 0.001 inch to 0.003 inch which minimizes heat sump effects, yet provides a base of adequate strength.

The colored pigment employed to coat the paper or metallic foil includes various powdered metals, such as those of which the foils are made, and various solid inorganic oxides. Non-limiting examples of the oxides include oxides of titanium, chromium, zinc, aluminum, iron, silicon, zirconium, lead, etc., the only requirement being that the pigment be of a color which contrasts with the color of the temperature indicating material. Then, when the indicating material melts, it will flow and mix with the pigment and the color of the latter becomes visible, registering the experiencing of a particular temperature. Preferably a relatively thin layer of the carbon-black or pigment coating, or of the colored absorbent material is used, again to avoid heat sump effects. In any event, the thickness should be sufficient so that the color of the pigment, carbon black, or colored material shows through the indicator when it has melted. Accordingly, a thickness of from about 0.001 inch to about .004 inch is found to be satisfactory, although a thickness of greater magnitude can be used.

The temperature indicating material, as stated above, consists of either organic or inorganic substances. Any compounds, which melt at the temperature required to be recorded, can be used. For example, methyl stearate is used to indicate a temperature of 100° F.

The temperature indicating material should be applied to a thickness just sufficient to cover the base of carbon black, pigment or the colored absorbent material. This is because, as discussed above, the pigment layer normally is kept very thin. The thickness of the temperature indicating material should be proportioned to that of the adjacent absorbing layer so that a discernible color change will be brought about upon its melting and either absorption by the material or intermixing with pigment adjacent to it. For example, when a visible sample of methylstearate is disposed on black blotting paper and the two heated to substantially 100° F. at which the former melts, the amounts should be such that a sufficient fraction of the methyl stearate is absorbed in the blotting paper to indicate the melting of the sample. When the blotting paper absorbs the melted sample, the color of the blotting paper will become visible at the location previously obscured by the presence of the sample. In like manner upon the melting of a sample which has been disposed on a layer of pigment, the sample and pigment will become mixed and the color of the pigment will become visible.

As stated above, the color of the absorbent material or pigment should contrast with the sample which melts in order that the change upon melting will be readily discernable. If this requirement is complied with, any color is suitable. Thus, the absorbent material or pigment may be black, blue, green, purple, red, yellow, white, etc. There is likewise no restriction on the color of the sample which melts.

The sample of temperature indicating material is made up into a layer having a thickness of from about 0.0001 inch to about .001 inch. It is disposed on an absorbent material or pigment layer of a thickness sufficient to absorb or mix with the melted sample and make the color of the material or pigment visible at the location where the unmelted sample had been placed. The thickness of the absorbent material or pigment also varies from about 0.001 to about 0.004 inch. However, thickness of up to 0.1 inch and greater can also be used. Since, however, the change upon melting may be observed with a minimum thickness of indicating material, there is no necessity to employ thicknesses greater than about 0.01 inch. A preferred embodiment of this invention is to employ the temperature indicating material in a layer of from about 0.0001 to about 0.001 inch in thickness in order to minimize heat sump effects. The total amount of indicator material employed to indicate any one temperature is also not critical. Amounts of from about 0.01 milligram to about 0.1 grams and more, produce satisfactory results.

Thus, in general the various thicknesses of the parts making up the temperature indicator of this invention are not critical. It is necessary to proportion the amount of temperature indicating material to the absorbent layer adjacent to it so that the indicating material will be absorbed or intermixed when melted, and the change in temperature can be observed. Otherwise, considerable latitude is permitted.

However, the results are much better when minimum thicknesses are employed consistent with a unit of adequate, practical strength. This is to reduce heat sump effects assuring that the temperature indicating material will not be unduly insulated from the object with which it is associated and will reach virtually the same temperature as the object when the latter is heated. Also, when the components are thin, the device also has considerable flexibility, and can assume the contour of a sharply curved object without being damaged in the process. The examples given herein are set forth with these considerations in mind.

Non-limiting examples of temperature indicating materials employed in this invention are given in the following table.

TABLE

| No. | Compound—Organic Compounds | Formula | Melting Point, °F. |
|---|---|---|---|
| 1 | Methyl Stearate | $C_{17}H_{35}COOCH_3$ | 100 |
| 2 | Myristic acid | $CH_3(CH_2)_{12}COOH$ | 136 |
| 3 | Palmitic acid | $CH_3(CH_2)_{14}COOH$ | 147 |
| 4 | Stearic acid | $CH_3(CH_2)_{16}COOH$ | 157 |
| 5 | λ-Hydroxy stearic acid | $CH_3(CH_2)_5CHOH(CH_2)_{10}COOH$ | 178 |
| 6 | p-Propenylphenol | $CH_3CH:CHC_6H_4OH$ | 198 |
| 7 | Benzoic acid | $C_6H_5COOH$ | 250 |
| 8 | Camphene hydrochloride | $C_{10}H_{17}Cl$ | 300 |
| 9 | 1,5-Dihydroxy-naphthalene | $C_{10}H_6(OH)_2$ | 350 |
| 10 | 1-Naphthamide | $C_{10}H_7CONH_2$ | 400 |
| 11 | Berberonic acid anhydride | $C_5H_2N(COOH)_3$ | 450 |
| 12 | Hexamethylenetetraamine | $(CH_2)_6N_4$ | 500 |
| 13 | Uvitonic acid | $CH_3C_5H_2N(COOH)_2$ | 525 |
| 14 | Uvitic acid | $CH_3C_6H_3(COOH)_2$ | 550 |
| 15 | Tyrosine | $HOC_6H_4CH_2CH(NH_2)COOH$ | 600 |
| 16 | Picene | $C_{22}H_{14}$ | 700 |
| 17 | Sodium salt of benzenesulfonic acid | $C_6H_5SO_3Na$ | 842 |
| 18 | Chromium chloride | $Cr(H_2O)_6Cl_3$ | 203 |
| 19 | Nickel stearate | $Ni(C_{18}H_{35}O_2)_2$ | 212 |
| 20 | Lead stearate | $Pb(C_{18}H_{35}O_2)_2$ | 240 |
| 21 | Thallium palmitate | $TlC_{16}H_{31}O_2$ | 240 |
| 22 | Cupric ethylacetoacetate | $Cu(C_6H_9O_3)_2$ | 378 |
| 23 | Barium Laurate | $Ba(C_{12}H_{23}O_2)_2$ | 500 |
| 24 | Mercuric iodide | $HgI_2$ | 500 |
| 25 | Ferric chloride | $FeCl_3$ | 540 |
| 26 | Silver iodide | $AgI$ | 1,026 |
| 27 | Cuprous Iodide | $CuI$ | 1,120 |
| 28 | Ferrous chloride | $FeCl_2$ | 1,240 |
| 29 | Magnesium chloride | $MgCl_2$ | 1,306 |
| 30 | Zinc borate | $3ZnO \cdot 2B_2O_3$ | 1,800 |

Still other temperature indicating materials will be apparent to those skilled in the art. Mixtures of the various compounds are also used to give still other melting point compositions as is well known in the art. From the above table, it is seen that the organic compounds contain from about 7 to about 22 carbon atoms. However, the number of carbon atoms is not restricted to this range. It is also seen that the organic compounds include hydrocarbons, acids, acid anhydrides, esters, hydroxyacids, phenols, hydrohalic acid salts, hydroxy-substituted hydrocarbons, amines, amides, amino acids, sulfonic acid salts, etc. The inorganic compounds include metal borates, metal salts of organic acids and inorganic acids such as the hydrohalic acids. This includes salts in which the halogen have average atomic weights from about 35 to about 127. The average atomic weights of the metals making up the salts range from about 24 to about 207.

A plurality of temperature indicating samples can be assembled in one frame as illustrated in the drawing. The frame can be assembled with each sample melting at a different predetermined temperature. Then, when attached to a specimen whose temperature is to be monitored, it will be possible to observe when the specimen reaches each of the predetermined temperatures corresponding with the melting point of the individual indicator samples.

It is often found advantageous to mix a minor amount of carbon black or of pigment of the kind described above with the temperature indicating material. The chemicals of the temperature indicating material in most instances return to a near original or pre-exposure shade when cooled. The color of the carbon black or pigment, which contrasts with the color of the temperature indicating material, predominates during and after exposure to the melting temperature. An excursion to the melting temperature by the indicating material and the surface to which it is attached is thus recorded for easy observation. The amount of pigment, including carbon black, can vary from about 1 to about 49 weight percent based on the total weight of pigment and temperature indicating material. It is found that from about 5 to about 45 weight percent of carbon black or pigment in a temperature indicator material of a contrasting color gives good results in providing records of temperatures and this range therefore, constitutes a preferred embodiment of this invention. When carbon black is mixed with the indicating material, 35 weight percent of the former is found to provide a very readily observable indication of the melting of the indicating substance and this amount constitutes an especially preferred embodiment of this invention.

The temperature indicating material and the color absorbent material or strip of metal foil are kept in place by a film of transparent material 15 as shown in FIG. 1, which can be a sheet of mica 27 as shown in FIG. 4. The transparent material, either plastic or mica, is kept in place by an adhesive. The adhesive is shown in FIG. 1 as a layer 17 on base 11, and in FIG. 4 as layer 22 on base 21. It is, however, not necessary that the adhesive be disposed as a film on the base. It is only necessary that the color absorbent material or pigment-coated strip and the temperature indicating substance together with the transparent cover be held in place. This is accomplished by means of a suitable adhesive, well known in the art, between the contacting surfaces of the base and the transparent cover. Alternatively the components of the assembled temperature indicator may be kept in place by an adhesive between the contacting surfaces of the base 21 and perforated metal foil 28 as shown in FIGS. 4 and 6. The perforations in the metal foil are located over the indicator samples under the transparent cover made of plastic or mica. The perforated metal foil is made of any of the metals and alloys used for the base as discussed above.

An adhesive can also be used in bonding all contacting surfaces together. For example, an embodiment of this invention is to bond the temperature indicating material to the colored absorbent material or pigment-coated foil with propylene dichloride. Another embodiment is the use of an adhesive of propylene dichloride containing from about 0.1 to about 20 weight percent styrene resin, the percentage being based on the total weight of the adhesive composition. Another embodiment is the use of any of the adhesives described below which are employed with the plastic films.

A method of applying the pigment, including carbon black to the metal foil base is to mix it with an alkaline earth carbonate such as calcium or barium carbonate. The pigment, and from about 1 to about 40 weight percent carbonate, preferred 5 to 30 weight percent, is mixed with sufficient water to provide a mixture having a spreadable consistency. The percentage by weight is based on the combined weight of pigment and carbonate. The mixture is applied by any suitable means to the surface of the metal foil base such as by brush or spatula. If desired, the mixture may be diluted with additional water or organic diluent, such as methylethyl ketone, and sprayed on. The thickness of the mixture can vary from about 0.001 to about 0.004 inch as stated above. Such a composition of pigment and alkaline earth carbonate readily absorbs the temperature sensitive compound when the latter melts. Hence, a preferred embodiment of this invention is a temperature indicator in which the absorbent substance consists of a mixture of pigment and alkaline earth carbonate.

The mica sheet employed in this invention is from about 0.001 inch to about 0.003 inch thick. A sheet of natural occurring mica serves well. When it is desired to insure that the mica is free from pores, the mica sheet is impregnated with a sealing solution and heated to a temperature sufficient to harden or cure the sealing components. One example of a sealing composition is tetraethylorthosilicate. The mica sheet impregnated with this composition is heated to a temperature of from about 180° C. to about 540° C. for a period of from about 0.1 to about 5 hours. Other tetrahydrocarbonorthosilicates are also used. Non-limiting examples are tetra dodecyl orthosilicate, diethyl diphenyl ortho silicate, etc. Reconstituted mica sheets prepared according to the processes described in U.S. Patent Nos. 2,549,880, 2,405,576 and 2,760,879 are also employed. Another embodiment, is to impregnate the mica with a glaze or varnish and then heat at a temperature of from about 200° F. to about 400° F. until the glaze or varnish has hardened. One varnish suitable for this purpose is described in the U.S. Patent 2,880,188. Many varnishes and glaze materials are suitable and will be readily apparent to those skilled in the art. An embodiment of this invention is to impregnate a sheet of mica with a water solution of from about 1 to about 40 weight percent aluminum phosphate having a chemical composition of between dialuminum monohydrogen phosphate and monoaluminum dihydrogen phosphate and subjecting the impregnated sheet to from about 350° F. to about 450° F. until dried. Other methods of sealing the mica sheets will be apparent to those skilled in the art.

The adhesive employed for bonding the various elements or components of the temperature indicators of this invention are any of the well-known adhesives in the art. An example of an adhesive or cement is an epoxide resin obtained by the partial condensation of epichlorohydrin and 2,2-bis(4-hydroxyphenyl)-propane in the presence of a base such as sodium hydroxide. Such resins are known as glycidyl polyether resins and have an epoxy equivalency of between 1.0 and 2.0. The polymerization is carried out to a degree sufficient to provide a composition of a predetermined viscosity suitable for cement bonding purposes. An adhesive composition utilized for bonding in this invention is one containing polyepoxide material, as more fully described in U.S. Patent 2,682,515. If desired the surface of the plastic film can be modified for better adhesion according to the process described in U.S. Patent 2,764,502. The plastic film can have a pressure-sensitive adhesive on one or both surfaces. These are commonly known as adhesive sheets in the art. Sheets of this kind that are used in the assembly of the temperature indicators of this invention are described in U.S. Patent 2,790,782. Adhesive backed sheets of this type are used, for example, for the base 11 and cover 15 of the indicator shown in FIGS. 1 and 3. In this instance the two opposite surfaces contain adhesive. An adhesive backed film of this type is also employed for the base 21 in the assembly of the indicator shown in FIGS. 4 and 6. One method involves turning the adhesive surface upward and bonding the perforated metal foil cover 28 to the base and thus sandwiching the mica sheet, temperature sensitive indicators and pigment coated metal foil therebetween. Additional adhesive is then applied to the lower surface of the base 21 and exposed lower surface of perforated metal foil cover 28 prior to affixing the indicator to the surface of a workpiece whose temperature history is to be monitored. Other adhesive backed plastic sheet materials that are used for the base member and/or transparent cover member are the silicone pressure adhesive sheet material described in U.S. Patent 2,882,183 and the material of U.S. Patent 2,789,155. Still other suitable plastic materials will be apparent to those skilled in the art.

When the lower surface of the base member of the indicator and the exposed lower surface of the transparent cover or perforated metal foil cover are coated with a pressure sensitive adhesive, the latter is protected by an anti-blocking material. One anti-blocking material employed is a film of polytetrafluoroethylene. The preparation of this material is well known in the art and will not be discussed in this writing. Other antiblocking material used are those described in U.S. Patent 2,803,613. Still other anti-adhesive backings will be apparent to those skilled in the art.

Temperature indicators which are employed at high temperature, say 700° F. and higher, preferably are bonded to the surface of a work-piece whose temperature is to be monitored with the aid of a high temperature adhesive. One such adhesive is a neoprene solution containing asbestos fibers. A specific example of such an adhesive is a solution containing 60 weight percent neoprene polymer, 20 weight percent asbestos fibers, 10 weight percent aluminum powder, and 10 weight percent ethyl alcohol. One form of asbestos employed in the above described adhesive composition is that known as Blue African asbestos fiber. The polyepoxide or glycidyl polyether composition discussed above are also employed for high temperature bonding. Still other high temperature resistant adhesives will be apparent to those skilled in the art.

The following non-limiting examples illustrate the temperature indicators of this invention.

*Example I*

A temperature indicator was assembled as illustrated in FIGS. 1, 2 and 3. The plastic envelope composed of the base member 11 and the transparent cover 15 were made of polyethylene terephthalate film obtained by the condensation of ethylene glycol and terephthalic acid. The base and cover were bonded with the aid of a pressure sensitive adhesive film having an organosilicon polymer resinous base as described in U.S. Patent 2,878,142. The pressure sensitive adhesive was also disposed on the surface of the base furthest removed from the cover member. The colored absorbent material consisted of a strip of black blotting paper. The temperature indicating materials consisted of individual samples of four different compounds substantially 0.0001 inch thick and 0.25 inch in diameter. The four compounds were methyl stearate, myrisitic acid, palmitic acid and stearic acid, having melting points of 100° F., 136° F., 147° F. and 157° F. respectively. The adhesive on the lower surface of the base member was protected by a film of polytetrafluoroethylene.

Example II

An indicator was assembled as in Example I employing indicator samples of λ-hydroxy stearic acid, p-propenylphenol, benzoic acid and camphene hydrochloride. The samples were 0.001 inch thick and about 0.2 inch in diameter and contained substantially 1 weight percent carbon black substantially uniformly distributed throughout. The indicator samples were anchored to the black blotting paper by a layer about 0.001 inch thick of propylene dichloride adhesive solution.

Example III

An indicator was assembled as in Example II with the modification that the propylene dichloride adhesive contained 0.1 wt. percent styrene resin, and the indicator samples contained 35 wt. percent carbon black. The black blotting paper was substantially 0.003 inch thick.

Example IV

An indicator is assembled as in Example II employing 6 indicating samples of chromium chloride, lead stearate, 1,5 dihydroxynaphthalene, cupric ethyl acetoacetate, berberonic acid anhydride, and barium laurate mixed with 5 wt. percent carbon black. The samples are substantially 0.002 inch in thickness and 0.3 inch in diameter. The colored material 13 consists of a strip of black paper containing a layer of carbon black substantially 0.002 inch thick on its surface. The indicator samples are anchored to the carbon on the paper with a film of epoxide resin.

Example V

An indicator is assembled as in Example IV using strip of aluminum foil for member 13 in FIGS. 1–3. The base has a 0.004 inch layer of carbon black containing 1 wt. percent calcium carbonate on its surface. The indicator samples contain 49 wt. percent carbon black and are anchored to the carbon black on the surface of the base with a film of propylene adhesive containing 20 wt. percent styrene resin.

Example VI

An indicator is assembled as shown in FIGS. 4–6 using indicator samples of uvitonic acid, uvitic acid, tyrosine and picene containing 5 wt. percent cuprous iodide. The foil 24 is made of copper and contains a layer 0.001 inch thick of a mixture of 60 wt. percent cuprous iodide and 40 wt. percent barium carbonate. The indicator samples are 0.1 inch thick and 0.25 inch in diameter. They are anchored to the cuprous iodide-barium carbonate layer with a 0.002 inch film of a methylmethacrylate resin adhesive solution. The mica film 27 is 0.003 inch thick. The perforated cover is of copper and is bonded to a polyethylene base 21 by means of a pressure sensitive silicone base adhesive of the type described above. A silicone base pressure sensitive adhesive is also disposed on the lower surface of the base 21. A polytetrafluoethylene anti-blocking film 30 adheres to the lower surface of the base 21, protecting the adhesive.

Example VII

An indicator is assembled as in Example VI employing indicator samples of sodium benzene sulfonate, silver iodide, cuprous iodide and ferrous chloride. The samples are substantially 0.001 inch thick, 0.02 inch in diameter and contain substantially 45 wt. percent carbon black. The metal foil 24 is of stainless steel substantially 0.01 inch thick and has a 0.01 inch layer of a mixture of 60 wt. percent carbon black, 20 wt. percent ferric oxide and 20 wt. percent calcium carbonate. The perforated cover is also of stainless steel. The mica sheet is sealed with tetraethyl orthosilicate as described above. The indicator samples are anchored to the carbon black-ferric oxide-calcium carbonate layer with a thin film of propylene chloride adhesive containing 20 wt. percent styrene resin.

The above examples are illustrative only. Many other indicators have been assembled using other temperature sensitive compositions, different plastics, adhesives, metal foils, pigments, etc., as brought out in the discussion hereinabove. It is to be noted that the figures are not drawn to scale. Many of the components are magnified out of proportion in the interest of clarity.

Among the many temperature sensitive indicating substances not mentioned above are cobaltous chloride, cobaltous iodide and cobaltous citrate. Still other compounds will be apparent to one skilled in the art.

The percentages by weight of the various components in this writing are based on the total weight of the particular composition involved. For example, in carbon black containing 20 wt. percent calcium carbonate, the percentage is based on the total weight of carbon black and calcium carbonate.

The indicator of Example III is attached by means of adhesive to a canned electrical unit impregnated with an ureamide-epoxide composition. The unit and indicator are placed in an electrically heated furnace. The furnace is slowly heated until each of the indicating substances has melted as indicated by the darkening of the area where the indicator is displayed. The unit is then removed from the furnace. Examination shows the encapsulating resin to be cured. A record of the time interval between the melting of the temperature indicating samples provides a history of the heat treating of the unit.

The indicator of Example VII is attached to the surface of a workpiece of titanium to be heat treated. An adhesive of neoprene rubber, alcohol, blue asbestos fiber and powdered aluminum as described hereinabove, is used to affix the indicator to the titanium. The workpiece and indicator are slowly heated in an oven. The time at which each of the indicating samples melts is recorded. When a temperature of 1120° F. is reached as indicated by the melting of the cuprous iodide sample and the change in color of the area occupied by it, the heat is turned off and the workpiece allowed to cool.

The indicators of this invention have many uses. They are used to indicate the maximum temperature attained by any part or system to which the indicator is attached. They are used to detect localized and general heating in experimental tests and as a safety device to detect overheating of equipment.

Although the invention has been described and illustrated in detail, it is to be understood that the same is by way of illustration and example only and is not to be taken by way of limitation, the spirit and scope of the invention being limited only by the terms of the appended claims.

We claim:

1. A temperature indicator comprising a backing material, a metallic base member disposed on said backing material, a colored pigment material disposed on said base member, a fusible temperature indicating material disposed on said colored material, said temperature indicating material being of a color which is different from the color of said colored pigment material, a transparent cover material adjacent said temperature indicating material, said cover material being bonded to said base member thereby enclosing said temperature indicating material and said colored material between said base material and said cover material, a metallic cover member having perforations therein adjacent said cover material, said perforations serving as view holes for observing said temperature indicating material, said cover member being bonded to said backing material thereby enclosing said base member, color indicating material and transparent cover material between said backing material and said cover member.

2. The temperature indicator of claim 1 having an adhesive substance disposed on that surface of said backing material farthest removed from said cover member.

3. The temperature indicator of claim 1 having an adhesive substance disposed on that surface of said backing material farthest removed from said cover member and an anti adhesive substance disposed on said adhesive.

4. The temperature indicator of claim 1 wherein said temperature indicating material contains a minor amount of said colored pigment material.

5. The temperature indicator of claim 1 wherein said temperature indicating material contains a minor amount of carbon black and said colored material is carbon black.

6. The temperature indicator of claim 1 wherein said temperature indicating material contains a minor amount of said colored pigment material, and wherein said colored pigment material contains from about 1 to about 40 weight of an alkaline earth carbonate based on the combined weight of said colored material and said carbonate.

7. A temperature indicator comprising a backing material, a metallic base member disposed on said backing material, a colored pigment material disposed on said metallic base, a plurality of discrete temperature indicating materials in spaced apart relationship disposed on said colored material, said temperature indicating material being of a color which is different from the color of said colored pigment material, a transparent cover material adjacent said temperature indicating material, said cover material being bonded to said base member thereby enclosing said temperature indicating material and said colored material between said base and said cover material, a metallic cover member having perforations therein adjacent said cover material said perforations serving as view holes for observing said temperature indicating material, said cover member being bonded to said backing material thereby enclosing said base member, color indicating material and transparent cover material between said backing material and said cover member.

8. The temperature indicator of claim 7 wherein said transparent cover material is composed of mica.

9. A temperature indicator comprising a backing material, a metallic base member disposed on said backing material, a colored pigment material containing from about 1 to about 40 weight percent of an alkaline earth carbonate disposed on said base member, a plurality of discrete temperature indicating materials in spaced apart relationship disposed on and bonded to said colored pigment material, said temperature indicating material being of a color which is different from the color of said colored pigment material, a transparent mica cover material adjacent said temperature indicating material, said cover material being bonded to said base member thereby enclosing said temperature indicating material and said colored material between said base and said cover material, a metallic cover member having perforations therein adjacent said cover material, said perforations serving as view holes for observing said temperature indicating material, said cover member being bonded to said backing material thereby enclosing said base member, color indicating material and transparent cover material between said backing material and said cover member.

10. A temperature indicator comprising a relatively thin metal foil base member, a quantity of carbon black constituting a coating on said base member, and a fusible temperature indicating material disposed on said coating, said temperature indicating material being of a color which is different from the color of said carbon black.

11. A device as recited in claim 10 in which said metal foil base member is from about 0.001 inch to about 0.003 inch in thickness.

12. A device as recited in claim 10 in which said temperature indicating material includes from five to forty-five percent by weight of carbon black based on the total weight of said temperature indicating material and carbon black mixture.

13. A device as recited in claim 11 in which said carbon black coating is from about 0.001 inch to about 0.004 inch in thickness.

14. A device as recited in claim 13 in which said temperature indicating material is from about 0.0001 inch to about 0.001 inch in thickness.

References Cited in the file of this patent

UNITED STATES PATENTS

| | | |
|---|---|---|
| 1,535,536 | MacDonald | Apr. 28, 1925 |
| 1,938,583 | Derby | Dec. 12, 1933 |
| 2,490,933 | Tornquist et al. | Dec. 13, 1949 |
| 2,614,430 | Ballard et al. | Oct. 21, 1952 |
| 2,928,791 | Loconti | Mar. 15, 1960 |